No. 627,352. Patented June 20, 1899.
J. C. RAYMOND.
HARNESS.
(Application filed Apr. 4, 1898.)
(No Model.)
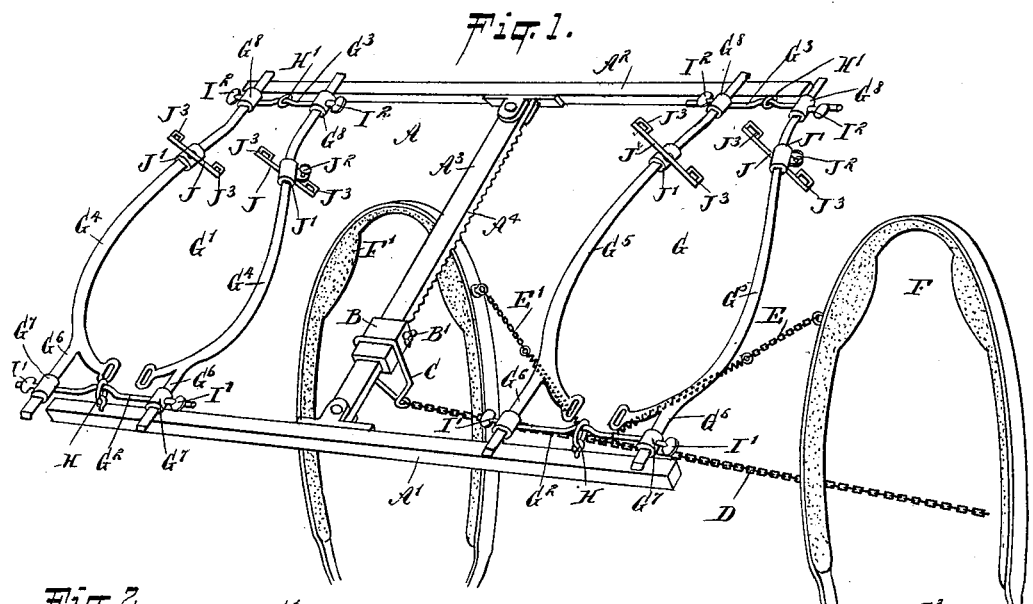
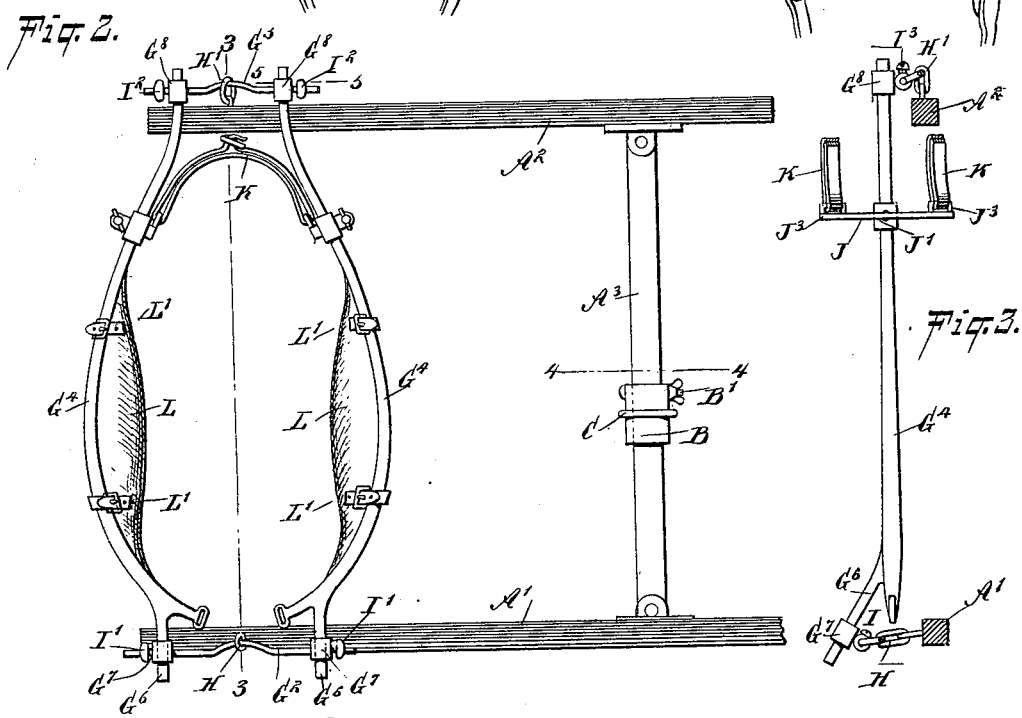
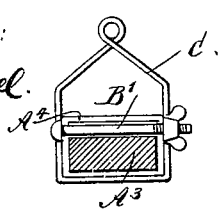
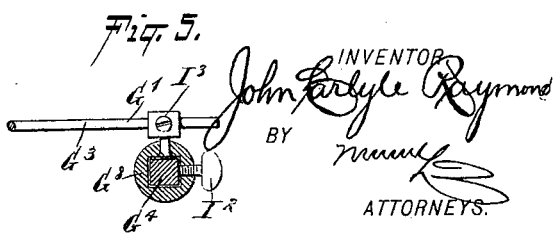
WITNESSES:
INVENTOR
ATTORNEYS.

UNITED STATES PATENT OFFICE.

JOHN CARLYLE RAYMOND, OF KEYPORT, NEW JERSEY.

HARNESS.

SPECIFICATION forming part of Letters Patent No. 627,352, dated June 20, 1899.

Application filed April 4, 1898. Serial No. 676,380. (No model.)

*To all whom it may concern:*

Be it known that I, JOHN CARLYLE RAYMOND, of Keyport, in the county of Monmouth and State of New Jersey, have invented certain new and useful Improvements in Harnesses, of which the following is a full, clear, and exact description.

The object of the invention is to provide certain new and useful improvements in harnesses more especially designed for use on teams employed for plowing, harrowing, or dragging other implements and loads, the harness being arranged to obviate all chafing and rubbing and to prevent the flexible pole or drag-chain from striking and injuring the animals when turning at the end of a row or furrow or at corners.

The invention consists of novel features and parts and combinations of the same, as will be fully described hereinafter and then pointed out in the claim.

Reference is to be had to the accompanying drawings, forming a part of this specification, in which similar characters of reference indicate corresponding parts in all the figures.

Figure 1 is a perspective view of the improvement. Fig. 2 is a front elevation of the same with pads attached to the hames. Fig. 3 is a longitudinal section of the same on the line 3 3 of Fig. 2. Fig. 4 is an enlarged sectional plan view of part of the improvement on the line 4 4 of Fig. 2, and Fig. 5 is a similar view of another part of the improvement on the line 5 5 of Fig. 2.

The improved harness is provided with a hame-frame A, consisting of transverse parallel bars $A'$ $A^2$, pivotally connected with each other at or near their middle by a post $A^3$, on which is held adjustably a block B, carrying the clevis C, to which the forward end of the flexible pole or drag-chain D is attached. The chain D connects at its rear end with a plow, harrow, or other implement or load to be drawn by the team over the ground. The block B is adjustably secured to the post $A^3$ and is for this purpose provided with a transverse bolt $B'$, adapted to engage one end of a series of recesses $A^4$, formed on the inner face of the said post. (See Figs. 1 and 4.) By removing the bolt $B'$ the block B, with the clevis C, can be readily moved up or down on the pole to the desired position and then secured in place by replacing the bolt $B'$. By this arrangement the pulling strain may be brought farther up or down on the hame-frame A, so that the strain is equally divided on the team.

The flexible pole or drag-chain D is connected by chains E $E'$ with the saddles F $F'$, respectively, secured in the usual manner on the backs of the animals, the chains E $E'$ extending downwardly and inwardly from the saddles to connect with the chain D a suitable distance in the rear of the clevis C, so that the chain or flexible pole D is held up to prevent the rear portion from striking the legs of the animals when turning at the end of a furrow or turning a corner or the like. The frame A carries at its outer ends two hames G $G'$, which may be used with the triangular collars or without the same.

Each of the hames G $G'$ is provided with a bottom bar $G^2$ and a top bar $G^3$, pivotally connected at their middle by links H $H'$, respectively, with the cross-bars $A'$ $A^2$ of the hame-frame, said links H $H'$ being either at the top or front of the bars $A'$ $A^2$, as desired. The hame-rods $G^4$ $G^5$ are provided at their lower ends with the usual eyes for straps to close the hame-rods, and are also provided with extension-rods $G^6$, each engaging an eye $G^7$, slidable on the corresponding bar $G^2$ and adapted to be secured thereto by a suitable set-screw I, a similar set-screw $I'$ being in the eye $G^7$ for fastening the latter to the extension-rod $G^6$. The upper end of each hame-rod loosely engages an eye $G^8$ on the ends of the bar $G^3$, and a set-screw $I^2$ serves to fasten the eye and the hame-rod together, with a set-screw $I^3$ for fastening the eye $G^8$ to the bar $G^3$, as indicated in Fig. 5. By this arrangement the hame-rods $G^4$ $G^5$ can be adjusted so as to be nearer to or farther from each other, according to the size of the collar or the neck of the animal, and the hame-rods may also be adjusted vertically in the eyes $G^7$ and $G^8$ to properly fit the hame-rods to the collars.

Near the upper end of each hame-rod $G^4$ $G^5$ is adjustably held a strap-rod J, formed with a clamping-collar $J'$, adapted to be fastened in place on the rod by a set-screw $J^2$. Each rod J extends in opposite directions from the hame-rod, and each end is provided with a loop $J^3$ for attaching a band K, adapted to extend over the neck of the animal, to the opposite loop J³ of the rod J on the other hame-rod. (See Fig. 3.) If desired, a single strap K may be employed, having the ends connected with the loops J³, said strap being especially serviceable when the hames are used on animals without collars, the hame-rods then being provided with pads L, held to the rods by suitable straps L', as indicated in Fig. 2.

Now it is evident that by the arrangement described the hames G G' can be readily fitted to the neck of the animal or the collar used thereon, and by having the hames pivotally connected with the hame-frame it is evident that the individual motion of one of the animals does not seriously bind or affect the hames on the other animal, and at the same time the animals are held at all times in proper relation to each other, so as to render the management of the animals comparatively easy.

By having the cross-bars A' A² pivoted on the post A³ the up-and-down movement of the neck of either animal does not affect the hame of the other animal.

Having thus described my invention, I claim as new and desire to secure by Letters Patent—

A hame comprising top and bottom cross-bars arranged for pivotal connection at their middle with a supporting-frame, each cross-bar being formed at its ends with eyes, hame-rods adjustably secured in the said eyes of the cross-bars, and a strap-rod on each of the hame-rods and extending transversely of the hame-rods beyond both sides thereof, substantially as shown and described.

JOHN CARLYLE RAYMOND.

Witnesses:
 THEO. G. HOSTER,
 JNO. M. RITTER.